United States Patent [19]

McGarr

[11] 3,917,741
[45] *Nov. 4, 1975

[54] METHOD OF MAKING POLYURETHANE POWDER

[75] Inventor: John J. McGarr, Beverly, Mass.

[73] Assignee: USM Corporation, Boston, Mass.

[ * ] Notice: The portion of the term of this patent subsequent to Jan. 22, 1991, has been disclaimed.

[22] Filed: May 9, 1973

[21] Appl. No.: 358,476

Related U.S. Application Data

[63] Continuation-in-part of Ser. Nos. 263,658, June 16, 1972, Pat. No. 3,817,886, and Ser. No. 278,611, Aug. 7, 1972, Pat. No. 3,787,525.

[52] U.S. Cl....... 260/859 R; 260/33.4 R; 260/37 N; 260/77.5 CR; 260/830 P; 260/835; 260/858
[51] Int. Cl.$^2$.......................................... C08L 75/00
[58] Field of Search............................ 260/859, 858

[56] References Cited

UNITED STATES PATENTS

| | | | |
|---|---|---|---|
| 3,236,812 | 2/1966 | McElroy | 260/30.8 DS |
| 3,317,635 | 5/1967 | Osmond | 260/859 R |
| 3,382,297 | 5/1968 | Thompson | 260/859 R |
| 3,405,087 | 10/1968 | Fryd | 260/859 R |
| 3,428,711 | 2/1969 | Hunt | 260/859 R |
| 3,472,798 | 10/1969 | Pitchforth | 260/859 R |
| 3,716,505 | 2/1973 | Ohe | 260/859 R |
| 3,763,065 | 10/1973 | Herrmann | 260/859 R |
| 3,773,857 | 11/1973 | Kondo | 260/859 R |
| 3,787,525 | 1/1974 | McGarr | 260/77.5 CR |

FOREIGN PATENTS OR APPLICATIONS 538,977   12/1957   Canada

Primary Examiner—Paul Lieberman
Attorney, Agent, or Firm—Benjamin C. Pollard; Vincent A. White; Richard B. Megley

[57] ABSTRACT

Method for preparing polyurethane resin directly in finely divided form in which method a first reactant for forming the polyurethane is emulsified as fine droplets with the aid of special surfactants and controls in an inert organic liquid medium in which it and polyurethane resin are insoluble, a second reactant for combination with the first reactant is introduced into the liquid medium and interacted interfacially with the droplets of the first reactant to form fine particles of solid polyurethane resin protected from agglomeration by the surfactant, and the particles of polyurethane resin are separated from the liquid medium.

10 Claims, No Drawings

METHOD OF MAKING POLYURETHANE POWDER

This application is a continuation-in-part of my earlier copending applications, U.S. Ser. No. 263,658, filed June 16, 1972, entitled "Manufacture of Particulate Material" and U.S. Serial No. 278,611, filed August 7, 1972, now U.S. Pat. No. 3,817,886 issued June 18, 1974 entitled "Method of Making Polyurethane Powder" now U.S. Pat. No. 3,787,525 issued Jan. 22, 1974.

BACKGROUND OF THE INVENTION

The demand for thermoplastic resin powders is large and steadily growing for such uses as coatings and adhesives, particularly in view of the increasing strictness of regulations regarding discharge of solvent materials into the atmosphere. In general, resin powders have been prepared by processes of grinding already formed resinous material or by dissolving already formed resinous material and precipitating the resinous material from solution. However, by the very fact that the resinous materials to be ground are thermoplastic and often tough materials, relatively costly procedures involving chilling of the resin, for example with liquid nitrogen, have been necessary for effective grinding. In addition to the cost of the refrigerant and of the grinding equipment, sophisticated collecting equipment has been necessary because of the substantial proportion of dust formed in the grinding process.

Solution and preparation procedures for forming powders have been costly because of the time involved in dissolving the resin and the precipitation which is usually effected by adding to the resin solution an organic liquid miscible with the solvent but incapable of dissolving the resin. This procedure thus involves not only solvent recovery and separation of mixed organic liquids, but also the drying of the precipitated resin with the problems of avoiding escape of organic liquid material. It has been proposed to form resin latices and produce powder by coagulation of the latices; but this process is limited in the character of material to which it is applicable.

Also, it is known that polyurethane can be prepared by the interfacial polymerization of polyisocyanates with compounds containing hydroxyl groups when the reaction is conducted in an inert liquid medium where one of the reactants is insoluble in the medium and the other may be soluble or insoluble. However, efforts to make very fine particles of a uniform size below 100 microns have not been successful.

BRIEF SUMMARY OF THE INVENTION

It is an object of the present invention to manufacture a very fine resin powder directly, that is, without grinding and without the use of a solvent for the resinous material.

BRIEF STATEMENT OF THE INVENTION

To this end and in accordance with a feature of the present invention materials reactive to form solid polyurethane resins are introduced into an organic liquid medium which is inert to the reactive materials and in which at least one of the reactive materials and the solid polyurethane are insoluble. The insoluble reactive material is emulsified as fine droplets with the aid of special surfactants and reacts interfacially with the other reactive material present in the organic liquid medium to form finely divided particles of polyurethane. The particles of reaction product are insoluble in and will separate from the liquid medium.

DETAILED DESCRIPTION OF THE INVENTION

Polyurethane is made directly in very finely divided form by reaction between a first and second reactant in an organic liquid medium inert to the reactants. At least one of the reactants is insoluble in the organic liquid medium and is emulsified as fine droplets in a continuous phase of the liquid medium with the aid of special surfactants. Reaction between the reactants takes place at the surfaces of the droplets which constitute an interface between the reactants. The new product from chemical combination and polymerization of the reactants remains in dispersed form as solid particles insoluble in the organic liquid vehicle and may be separated as powder.

In a preferred form of the invention, the reactant for combination with the emulsified insoluble reactant may be soluble and dissolved in the liquid medium in which case the interface at which reaction occurs is the interface between the surfaces of the droplets and the solution containing the dissolved reactant. Reaction to form solid polyurethane starts at the surface of the droplets and progresses inwardly toward the less accessible center portions of the droplets. Because of this there is a difference between the —NCO to active hydrogen ratio at the surfaces and the ratio at the centers of the droplets and also a difference between molecular weight of the polyurethane at the surfaces and at the centers of the droplets.

These differences appear to be small where the droplets are extremely fine. Fine uniform polyurethane is obtained where the droplets are of the order of up to 200 microns in diameter and polyurethane useful for many purposes is obtainable where the droplets are as large as 500 microns.

Forming a uniform emulsion of the insoluble reactant as fine droplets of the required size with sufficient stability imposes special requirements on the surfactant in addition to chemical inertness in the reaction batch and exacting polarity requirements. Intensive agitation is needed to subdivide the reactant to the required extent and as the droplets react, they become more viscous and tacky with a tendency to deposit on surfaces such as the agitator blades and walls of the vessel in which the emulsion is formed. In addition to impeding deposition of the material on surfaces, the surfactant must also meet the conflicting requirements of letting the solidified polyurethane settle out when reaction has solidified the droplets as fine particles and yet keeping the particles from clumping together after settling.

The reaction mixture may be formed by introducing the two reactants into the organic liquid medium separately at the same time under conditions which emulsify the insoluble reactant and dissolve the soluble reactant in the liquid medium, or by separately emulsifying the insoluble reactant in a portion or organic liquid medium and adding the emulsion to a body of organic liquid medium containing the soluble organic reactant or by emulsifying the insoluble reactant in the organic liquid medium and adding the soluble reactant to the emulsion.

Alternatively, both of the reactants may be insoluble in the reaction medium, in which case both must be dispersed. Where both reactants are insoluble, reaction occurs between dispersed —NCO containing reactant and dispersed active hydrogen containing reactants. The mechanism of this is not entirely clear; but the surfactant requirement noted above of impeding deposition on surfaces of the agitator and emulsion vessel, and of both allowing settling of particles and prevention of clumping are similar to those in the preferred form, i.e., where one reactant is soluble in the reaction medium. Surfactants useful in the preferred form have in general been found useful where both reactants are insoluble.

The method of the present invention has been found particularly useful in the manufacture of polyurethane powder by reacting at least one organic compound of which at least two groups per molecule contain active hydrogen atoms which are reactive with —NCO groups, and at least one organic compound having at least two —NCO groups per molecule.

Organic liquids for use as the continuous phase of the emulsion may be any liquid not reactive with the reactants, e.g., not reactive with —NCO or with active hydrogens where the product is to be a polyurethane, and in which at least one of the reactants and the reaction product are insoluble. It is ordinarily desired that such liquids be volatile for removal from the reaction product by evaporation at temperatures which will not harm the product; and that the boiling point be above the desired reaction temperature. Liquids with lower boiling points may be used but may require the use of pressure vessels to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling point or boiling range, preferably between about 65°C. and about 200°C, such as hydrocarbons, halogenated hydrocarbons, and ethers may be used. Hydrocarbon liquids, preferably aliphatic hydrocarbon liquids, such as petroleum fractions, have been found desirable because of their low cost, inertness to the reactants and ease and completeness of removal from the reaction product.

Any organic compound or mixture of compounds having at least two —NCO groups may be used in the method to form polyurethanes. Monomeric polyisocyanates adapted for use include cyclohexylene-1,4-diisocyanate, 2,4-tolylene diisocyanate, 2,6-tolylene diisocyanate, 4,4'-diphenylmethane diisocyanate, 3,3'-dimethyldiphenylmethane-4,4'-diisocyanate and 4,4'-dicyclohexylmethane diisocyanate, p-phenylene diisocyanate, m-phenylene diisocyanate, xylylene diisocyanate, 1,4-naphthylene diisocyanate, diphenyl-4,4'-diisocyanate and hexamethylene diisocyanate.

Also, —NCO terminated products, i.e., prepolymers, from reacting a stoichiometric excess of one or more monomeric polyisocyanates with one or more organic compounds having at least two groups containing active hydrogen atoms may be used, particularly in the form of the process in which both reactants are insoluble in the reaction medium. For reaction to form such prepolymers, the monomeric polyisocyanates listed above may be used. Organic compounds having at least two groups containing active hydrogen atoms useful to form these —NCO terminated reaction products include hydroxyl terminated polyesters from reaction and polymerization of organic compounds having at least two hydroxyl groups such as glycol, hexanediol, bis-(hydroxy-methyl) cyclohexane, 1,4-butanediol, diethylene glycol and mixtures of these and organic compounds having at least two carboxyl groups such as adipic acid, succinic acid, sebacic acid, azelaic acid and mixtures of these, polyesteramides, polyhydric polyalkylene ethers, polyhydric polythioethers, polypropylene glycol, polybutylene glycol, polyalkylene ether glycols from condensation of an alkylene oxide such as ethylene oxide, propylene oxide and butylene oxide with a compound containing active hydrogens such as water, ethylene glycol and propylene glycol, polytetramethylene ether glycols and mixtures of these.

Any organic compound or mixture of compounds having at least two groups per molecule containing active hydrogens, may be employed as a reactant for reaction with —NCO terminated prepolymers. For reaction with prepolymers it is preferred that the compounds containing active hydrogens and which in this form of the method may be regarded as chain extenders, have molecular weights of from about 60 to about 300. Suitable compounds include 1,4-butanediol, 1,5-pentanediol, 1,6-hexanediol, diethylene glycol, p-phenylene-di-beta-hydroxy-ethyl ether, trimethylol propane, glycerol, alkanolamines such as diethanolamine, diamines, such as ethylene diamine, hexamethylene diamine and 4,4'-diaminodiphenyl methane.

The compound or compounds having reactive —NCO groups and the compound or compounds having groups containing active hydrogens are employed in relative proportions giving a molar ratio of active hydrogen to —NCO in the range of from about 0.85:1 to about 1.15:1. Where a thermoplastic resin is desired, the ratio should be from about 0.95:1 to about 1:05:1.

Use of a surfactant effective to aid in forming and maintaining an emulsion of very fine droplets of the immiscible reactant is of primary importance in the operation of the method to form very fine powders. Although little has been published on the preparation of nonaqueous emulsions, many of the principles which have evolved in the study of aqueous emulsions are valid. It has long been recognized that the suitability of emulsifying agents can be determined at least partly on the basis of their so-called hydrophile-lipophile balance numbers (HLB). Becher ("Emulsions, Theory and Practice", 2nd edition, page 233, Reinhold Publishing Corporation, New York) states that surfactants suitable for making water-in-oil emulsions are generally in the HLB range 3 to 6, while those suitable for making oil-in-water emulsions are generally in the HLB range 8 to 18. The well-known rule of Bancroft states that the external phase of an emulsion will be that in which the emulsifying agent is the more soluble. The factor of balance is important because if the disparity in solubility is too great — if the solubility is very high in one phase and very low in the other — no emulsion at all will be formed.

This concept of balance is further reinforced by the studies of J. H. Schulman and J. Leja (Transactions of the Faraday Society, Volume 50, papge 598, 1954) who showed that solid powders could stabilize oil-in-water emulsions if the contact angle across the water phase at the solid-oil-water interface were slightly smaller than 90°. If the contact angle were slightly greater than 90°, water-in-oil emulsions were formed. If the particles were completely wetted by either the oil or the water, no stable emulsions were formed.

The necessity of balance in nonaqueous systems is illustrated by the fact that stable dispersions of organic solids in organic liquids can be made using copolymers as surface active stabilizers. (British Patent to Osmond, No. 1,052,241, published Dec. 21, 1966). In such cases, one part of the copolymer is solvated by the organic liquid and the other part becomes associated with the dispersed solid. The patent teaches that, for use in the patented process, the copolymer must have a substantial molecular weight to be effective, suitably at least 7,000.

Building on the principles discussed above, I have found that an emulsion of fine droplets of an insoluble liquid reactant for the production of finely divided polyurethane particles can be prepared using a polymeric surfactant one part of which is solvated by the inert liquid reaction medium and the other part of which is associated with the reactant droplets. For example, in order to emulsify 1,4-butanediol in heptane, one might choose as surfactant a copolymer made from two types of monomer (a) one like vinyl pyrollidon, vinyl alcohol, acrylamida, etc., which, if homopolymerized, would be highly compatible with 1,4-butanediol and (b) one like vinyl stearate, lauryl methacrylate, long chain alpha-olefin etc., which, if homopolymerized, would be highly compatible with heptane. Furthermore, the molecular weight of the copolymer and the mole ratio of its monomeric constituents would be such that it would be somewhat more solvated by the heptane than by the 1,4-butanediol so that the heptane would be the external phase.

Not only is the molar ratio of polar to non-polar monomers important, but also the distribution of monomers in the copolymer, that is, whether the copolymer has a linear, graft or block structure. If the polar monomer contains a group such as nitrile, tertiary amine, lactam, etc., which can form strong dipole interactions with polar groups in the reactants or reaction product, a linear copolymer structure will often be adequate. However, if the polar monomer contains groups such as esters which will form only weak interactions with ester or ether groups in the reactants, then a graft or block structure is usually necessary so that by a multiplicity of such weak bonds, an adequate association can be brought about between the surfactant and the internal phase of the reaction mixture.

Since amphipathic copolymeric surfactants having the structure described herein have been shown in the present invention to be useful for producing polyurethanes in powdered form, it is to be expected that homopolymers composed of amphipathic monomers would also be useful for the same purposes. N-vinyl-3-octadecyl pyrrolidone, N-vinyl-5-dodecyl-3-morpholinone, 1-hexadecyl-acrylonitrile, N,N-dioctylaminoethyl methacrylate, etc., are examples of such monomers.

There must be some specificity to the surfactant according to the nature of the insoluble reactant chosen to produce the polyurethane. For example, in order to emulsify polytetramethylene ether glycol in heptane, would would require a surfactant with a polarity balance different from that required to emulsify hydroxyl terminated polybutylene adipate; since the former is less polar than the latter, the mole ratio of the polar moiety of the required surfactant would be less.

However, the requirement for specificity does not demand the synthesis of a new surfactant for each case. It is well known that in emulsifying oils of various HLB requirements in water one can product such emulsions with blends of various compositions of just two surfactants, one polar and the other less-polar. For example, using Span 20 with an HLB of 8.6 and Tween 20 with an HLB of 16.7, one can make blends of these surfactants that will produce oil-in-water emulsions of both mineral oil with an HLB requirement of 10 and benzene with an HLB requirement of 15.

A parallel situation exists in making emulsions of one organic liquid in another organic liquid. For example, using two copolymers of vinyl pyrrolidone and hexadecene-1, one containing 0.56:1 mole ratio of vinyl pyrrolidone to hexadecene-1 and the other 2.22:1 mole ratio, one can emulsify in heptane, hydroxy terminated polyethers or polyesters of different polarity by making blends of the copolymers having a polarity balance appropriate for the reactant to be emulsified.

P. A. Small (Journal of Applied Chemistry, Volume 3, page 71, 1953) has published a table of "molar-attraction constants" from which the solubility parameter of a polymer may be calculated when the structural formula, the density and the molecular weight are known. Specific numerical values are assigned to the ester, ether, aromatic groups and so on. From these values it can be calculated that the solubility parameter of polytetramethylene ether glycol, molecular weight 1,000, is about 8.5, whereas the solubility parameter of a polyurethane made from one equivalent of this polyether glycol, one equivalent of 1,4-butanediol and two equivalents of diphenylmethane diisocyanate is about 10.5. Thus, there is an appreciable increase in polarity when the polyether is converted to a polyurethane. Based on these considerations, one would not expect the ideal surfactant for emulsifying the polyether to be ideal surfactant for preventing agglomeration of the polyurethane product. Indeed, it would appear desirable for the action of the surfactant to be somewhat less than ideal, so that the particles of product will be large enough to settle rather than become a fine, stable dispersion which would render difficult the removal of the product from the reaction medium.

The molecular weight of the surfactant must be at least 2,000, preferably above 7,000, in order to provide a steric barrier of sufficient thickness to minimize coalescence of the liquid droplets of reactant and to prevent agglomeration of the solid particles of reaction product. The higher the molecular weight of the solvated portion of the surfactant molecule, the greater is the number of possible chain configurations it can assume. As two droplets of emulsion, or two particles of product, approach one another there is a reduction in available volume, an increase of interaction between the solvated chains associated with one particle and those associated with the other particle and a corresponding reduction in the number of possible chain configurations. This loss in configurational entropy provides the necessary repulsive force between droplets and between particles.

For emulsifying the insoluble liquid reactant in the present method and for preventing agglomeration of the reaction product, the products of copolymerizing vinyl pyrrolidone with an alkylated olefin to give copolymers having alkyl side chains of from 4 to 20 carbon atoms, the proportion of alkylated olefin of said copolymer being in the range of from about 10% to about 80% and the copolymers having a molecular weight of at least 7,000 have been found to be particularly effective surfactants. The nature and quantity of surfactant usef will depend on a variety of factors including the physical properties of the reactants and of the inert liquid medium the efficiency of the emulsifying equipment, the size of reaction product particle desired and so on. In general, from about 0.1% to about 10% of surfactant based on the weight of the emulsified reactant will be used.

In order to provide that at least about 95% by weight of the reaction product particles are in the range of 1 to 300 microns in diameter, that is, that they will be fine and yet settle readily, the quantity and effectiveness of the surfactant must be coordinated with the degree of agitation of the reaction mixture. The higher the molecular weight and the more suitable the balance of polar and less-polar groups in the surfactant with respect to the polarity of the emulsified reactant and of the reaction product, the less surfactant will been needed to produce the desired particle size when a given amount of agitation is used. Conversely, intense agitation can, to some extent, overcome deficiencies in the quality of the surfactant.

Catalysts are ordinarily employed to improve the rate and completeness of reaction. Any of a variety of known catalysts can be used including dibutyl tin dilaurate, stannous octoate, tertiary amines such as N-methylmorpholine and triethylamine, mercury catalysts such as phenyl mercuric propionate, lead naphthenate, lead octoate and others. Very small amounts, only sufficient to provide catalytic action, are used and it is preferred that the amount be from about 0.01% to about 1% by weight based on the weight of the reactants.

Any of the well-known emulsating equipment can be used to disperse the reactive materials. Thus, high speed agitating devices as well as homogenizers in which an emulsion is formed by forcing the materials as through narrow openings, have been found effective. These devices are used in accordance with procedures known to those skilled in the art. However, it is preferred to disperse the compound having groups with active hydrogen in the inert liquid medium containing the surfactant to form a creamy emulsion and thereafter to add the organic compound having —NCO groups and the catalyst. The relative weight of reactants to the weight of the inert liquid medium does not appear to be critical and emulsions have been made with as much as about 60% by weight of the reactive materials based on the weight of the final reaction mixture and it is preferred to use at least about 25% by weight of reactants.

In emulsifying liquid reactants it is preferred to operate under conditions giving a droplet size of from 1 to 300 microns, most preferably from 5 to 75 microns. The droplet size is controlled by the severity of agitating or homogenizing action and by the effectiveness of the surface active agent.

The time required for reaction to form solid polyurethane varies with the temperature, the efficiency of the catalyst and the reactivity of the components of the droplets. Reaction times may be from as little as 15 seconds for aliphatic amine - aromatic —NCO reaction to as much as 2 hours for hydroxyl-aliphatic —NCO.

Carrying out the reaction through dispersion of reactive materials in an inert solvent offers a number of advantages in addition to that of forming fine particle size reaction product directly. That is, good temperature control is achieved since the reaction takes place in a well-agitated liquid and in addition the relative proportions of the reactants are more uniform throughout the reaction system because of the dispersion of the reactive materials so that localized excessive concentrations of one or the other reactive materials are avoided.

Because of the fine, uniform, solidified condition of the reaction product, it is readily separated from the inert liquid medium by such known procedures as filtration, centrifugation and decantation. Conventional equipment for performing these operations may be used.

After separation of the finely divided reaction product, the product is normally washed with an inert organic liquid. This washing may be needed to remove the inert liqiud forming the continuous phase of the reaction emulsion where the reaction liquid is relatively non-volatile or otherwise difficult to remove. However, in any case, it is desirable to wash the reaction product in order to remove surfactant which may remain in the product after separation from the continuous phase.

Following the washing step, the reaction product is dried. It has been found useful with some reaction products to incorporate a finely divided solid material such as talc, silica or pigment to reduce a possible tendency of the particles to become agglomerated. This solid material may be introduced at any convenient stage either before separation of the finely divided reaction product from the inert liquid continuous phase or by suspending the reactive particles in a wash liquid along with the finely divided inorganic material or by admixture or stirring into the fine particles of reaction product either before or after drying.

Drying of the particles of reaction product may be effected in any suitable manner such as on trays or drying screens or by procedure comparable to fluid bed dyring in which a slurry of the fine particles of reaction product is suspended in contact with a warm or hot gas. In a drying operation comparable to fluid bed drying, a dusting material to prevent agglomeration of the particles may be included in the gaseous medium for drying the finely divided product.

The following examples are given to aid in understanding the invention but it is to be understood that the invention is not limited to the particular materials, temperatures, procedures and other conditions set forth in the examples.

EXAMPLE 1

634 gm. (1.268 eq.) of hydroxyl terminated polybutylene adipate, molecular weight 1,000, and 57.2 gm. (1.268 eq.) of 1,4-butanediol were emulsified in 1500 gm. of a liquid paraffinic hydrocarbon mixture (boiling range 174°C. to 207°C.) containing 28 gm. of a surfactant consisting of a copolymer of vinyl pyrrolidone and hexadecene-1 in the mole ratio of 1.72 to 1 and having an average molecular weight of 8,800. Thus, the molecules contained an average of about 36 polar pyrrolidone groups and 21 non-polar hexadecyl side chains. While this emulsion was being agitated vigorously at 65°C., there was added 317.9 gm. (2.54 eq.) of 4,4'-diphenylmethane diisocyanate, which had been stored at 65°C., and 1 gm. of dibutyl tin dilaurate as catalyst. After ¾ hour agitation, the reaction mixture consisted of fine particles dispersed in the liquid hydrocarbon. The particles were quite uniform and substantially free from fines. The particles settled out readily and over 95% by weight would settle out in a sample held over night. The reaction batch was filtered and the fine powdered product having a particle size less than 75 microns rinsed with heptane and air dried.

A film prepared from this product by pressing the powder between the platens of a hydraulic press with the platens at 165°C. and with a pressure of about 60 psi. had the following tensile properties:

| | |
|---|---|
| 100% modulus | 1,000 psi. |
| Tensile strength | 8,600 psi. |
| Elongation | 670% |

EXAMPLE 2

633 gm. (1.266 eq.) of hydroxyl terminated polybutylene adipate, mol. wt. 1,000 and 57.0 gm. (1.266 eq.) of 1,4-butanediol were emulsified in a surfactant solution identical to that of Example 1. While this emulsion wasa being agitated vigorously at 65°C., there was added 334 gm. (2.53 eq.) of 4,4'-dicyclohexylmethane diisocyanate, which had been stored at 65°C. and 5 gm. of dibutyl tin dilaurate. After 2 hours agitation, the reaction formed fine particles. The reaction batch was filtered and the fine powdered product having a particle size less than 75 microns rinsed with heptane and air dried.

A film prepared from this product on a hydraulic press with the platens at 150°C. and pressure of 60 psi. had the following tensile properties:

| | |
|---|---|
| 100% modulus | 850 psi. |
| Tensile strength | 7,300 psi. |
| Elongation | 560% |

EXAMPLE 3

87.5 gm. (0.175 eq.) of hydroxyl terminated polybutylene adipate, mol. wt. 1,000 and 23.7 gm. (0.525 eq.) of 1,4-butanediol were emulsified in 300 gm. of the hydrocarbon liquid of Example 1 containing 3.92 gm. of the surfactant used in Example 1. While this emulsion was being agitated vigorously at 65°C., there was added 87.5 gm. (0.700 eq.) of 4,4'-diphenyl methane diisocyanate, which had been stored at 65°C. and 0.2 gm. dibutyl tin dilaurate. After ¾ hour agitation, the reaction formed fine particles which settled readily from the hydrocarbon liquid. The reaction batch was filtered and the fine powder rinsed with heptane and air dried.

A film prepared from this product on a hydraulic press with the platens at 185°C. and a pressure of 60 psi. had the following tensile properties:

| | |
|---|---|
| 100% modulus | 2,800 psi. |
| Tensile strength | 7,700 psi. |
| Elongation | 425% |

EXAMPLE 4

Example 3 was repeated without the presence of surfactants. The dispersion of diols was very poor and there was a deposit of polyester on the walls of the glass vessel. Thirty seconds after the addition of the dibutyl tin dilaurate catalyst, it became impossible to agitate the gummy product, which consisted of a single, large lump.

EXAMPLE 5

100.2 gm. (0.2004 eq.) of hydroxyl terminated polybutylene adipate, mol. wt. 1,000 and 27.1 gm. (0.601 eq.) of 1,4-butanediol were emulsified in a surfactant solution identical to that of Example 3. While this emulsion was being agitated vigorously at 65°C., there was added 1 gm. of dibutyl tin dilaurate and then over a period of about 5 minutes, 67.3 gm. (0.773 eq.) of an isomeric mixture of 80% 2,4- and 2,6-tolylene diisocyanate. After ¾ hour agitation, fine solid particles were formed which settled readily from the hydrocarbon liquid. The reaction batch was filtered and the fine powder rinsed with heptane and air dried.

A film prepared from this product on a hydraulic press with platens at 150°C, and a pressure of 60 psi. had the following tensile properties:

| | |
|---|---|
| 100% modulus | 220 psi |
| Tensile strength | 2,000 psi |
| Elongation | 900% |

EXAMPLE 6

616 gm. (1.232 eq.) of polytetramethylene ether glycol, mol. wt. 1,000 and 55.5 gm. (1.232 eq.) of 1,4-butanediol were emulsified in 1,400 gm. of heptane containing 28 gm. of a surfactant consisting of a copolymer of vinyl pyrrolidone and hexadecene-1 in the mole ratio of 0.56 to 1, and having an average mol. wt. 7,300. Thus, the molecules contained an average of about 14 polar pyrrolidone groups and 26 non-polar hexadecyl side chains. While this emulsion was being agitated vigorously at 24°C., there was added 5 gm. of dibutyl tin dilaurate and then, over a period of about 30 minutes, from a heated reservoir, 305 gm. (2.44 eq.) of 4,4'-diphenylmethane diisocyanate. The mixture was agitated for another ¾ hour to form a slurry of fine uniform particles which settled readily such that 95% by weight would settle out of a sample held overnight. The slurry was filtered and the fine powder having a particle size less than 20 microns rinsed with heptane and air dried.

A film prepared from this product on a hydraulic press with the platens at 150°C. and pressure of 60 psi. had the following tensile properties:

| | |
|---|---|
| 100% modulus | 760 psi. |
| Tensile strength | 7,000 psi. |
| Elongation | 800% |

EXAMPLE 7

97.5 gm. (0.298 eq.) of polytetramethylene ether glycol, mol. wt. 654, and 16.14 gm. (0.358 eq.) of 1,4-butanediol were emulsified in 295 gm. of the hydrocarbon liquid of Example 1 containing 5.6 gm. of a polymer of lauryl methacrylate to which methyl methacrylate had been grafted. The molecular weight of the copolymer was about 22,000 and the mole ratio of lauryl to methyl methacrylate was about 1.7. Thus, the surfactant molecules contained about 41 weakly polar methyl methylacrylate ester groups and about 70 non-polar lauryl side chains. While this emulsion was being agitated vigorously at 68°C., there was added 87.22 gm. (0.656 eq.) of 4,4'-dicyclohexyl methane diisocyanate, which had been stored at 65°C., and 0.2 gm. dibutyl tin dilaurate. After 2 hours agitation, the reaction batch was a dispersion of fine particles. The reaction batch was filtered and the fine powdered rinsed with hexane and air dried.

A film prepared from this product on a hydraulic press with platens at 175°C. and pressure of 60 psi. had the following tensile properties:

| | |
|---|---|
| 100% modulus | 1,400 psi |
| Tensile strength | 8,200 psi |
| Elongation | 485% |

EXAMPLE 8

Example 7 was repeated except that the surfactant used was 5.6 gm. of a polymer of lauryl methacrylate to which glycidyl methacrylate had been grafted. The molecular weight of the copolymer was about 18,000 and the mole ratio of lauryl to glycidyl methacrylate was about 24. Thus, the surfactant molecules contained about 3 polar epoxy groups and about 69 non-polar lauryl side chains.

The film tensile properties were substantially the same as those of the product of Example 7.

EXAMPLE 9

Example 7 was repeated except that the surfactant used was 5.6 gm. of a "Y" copolymer which consisted of two blocks of polylaurylmethacrylate, each of 2,900 mol. wt., with their ends joined to the end of a block of polymethylmethacrylate of mol. wt. 2,600. Thus, the surfactant molecules contained about 26 weakly polar methyl methacrylate ester groups and about 23 non-polar lauryl side chains.

The film tensile properties were substantially the same as those of the product of Example 7.

EXAMPLE 10

A. 122.8 gm. (.245 eq.) of hydroxyl terminated polybutylene adipate, mol. wt. 1,000, and 11.05 gm. (0.245 eq.) of 1,4-butanediol were emulsified in 300 gm. of the hydrocarbon liquid of Example 1 containing 5.6 gm. of a linear copolymer of lauryl methacrylate and N,N-diethylaminoethyl methacrylate. The mol. wt. of the copolymer was about 3,700 and the mole ratio of lauryl to diethylaminoethyl methacrylate was 1.2. Thus, the surfactant molecules contained about 8 polar tertiary amine groups and 9 non-polar lauryl side chains. While this emulsion was being agitated vigorously at 68°C., there was added 0.2 gm. dibutyl tin dilaurate and 61.14 gm. (0.489 eq.) of 4,4'-diphenylmethane diisocyanate which had been stored at 65°C. After ¾ hour agitation, the reaction batch was filtered and the powdered product rinsed with hexane and air dried.

B. (A) was repeated except that the surfactant used was 0.28 gm. of the surfactant of Example 6.

C. (A) was repeated except that the surfactant used was a mixture of 5.32 gm. of the surfactant used in (A) and 0.28 gm. of the surfactant used in (B).

D. (A) was repeated except that the surfactant used was 11.2 gm. of a linear copolymer of octadecyl vinyl ether and acrylonitrile. The mol. wt. and the mole ratio were not determined because the properties were inadequate.

| | Emulsion Character[1] | Powder Character[2] |
|---|---|---|
| A | Poor | 4% smaller than 250 microns |
| B | Fair | 53% " |
| C | Fair | 98% " |
| D | Fair | Product agglomerated |

1. Based on visual evidence of turbidity which is a function of fineness of emulsiosn droplets.
2. Based on sieve analysis.

The fact tha the powder in (C) is finer than in either (A) or (B) may be interpreted as demonstrating either (1) synergism between the two surfactants, both in promoting emulsification and in protecting the product from agglomerating; or (2) that (A) is a better solids-dispersing surfactant than (B) even though it is clearly a poorer emulsifying agent.

The fact that (A) gave a powder (although coarse) from a poor emulsion while (D) gave no powder at all from a better emulsion clearly demonstrates that the two surfactant requirements are distinct. It is important to meet both requirements, good emulsification and good dispersion, to obtain a fine powder.

The tensile strengths of films made from powders A, B and C on a hydraulic press with platens at 190°C. and pressure of 60 psi. were substantially the same, i.e., 6,600 to 7,700 psi.

EXAMPLE 11

96.7 gm. of a prepolymer (prepared by reacting 2 equivalents of 4,4'-diphenylmethane diisocyanate with one equivalent of hydroxyl terminated polybutylene adipate, mol. wt. 1,000, for 3 hours at 80°C.) was emulsified in 150 gm. of the hydrocarbon liquid of Example 1 containing 2.8 gm. of the surfactant used in Example 1. While this emulsion was being stirred at 65°C. there was added 0.1 gm. of dibutyl tin dilaurate and 5.8 gm. of 1,4-butanediol. After ¾ hour stirring, the reaction formed fine particles dispersed in the liquid hydrocarbon. The particles settled out readily and over 95% by weight would settle out in a sample held overnight. The reaction batch was filtered and the particulate product rinsed with hexane and air dried. A film prepared from this product on a hydraulic press with platens at 150°C. and pressure of 60 psi. had the following tensile properties:

| | |
|---|---|
| 100% modulus | 1,000 psi. |
| Tensile strength | 10,000 psi. |
| Elongation | 625% |

EXAMPLE 12

30.1 gm. of a prepolymer (prepared by reacting 2 equivalents of an isomeric mixture of 80% 2,4- and 20% 2,6-tolylene diisocyanate with 1 equivalents of polytetramethylene ether glycol, mol. wt. 1,000, for 3 hours at 80°C.) was emulsified in 75 gm. of the hydrocarbon liquid of Example 1 containing 1.1 gm. of the surfactant used in Example 6. While this emulsion was being stirred at room temperature, there was added a dispersion of 2.23 gm. of 2-methyl piperazine in the same liquid hydrocarbon. (This dispersion was prepared by dissolving the 2.23 gm. of 2-methyl piperazine in 4.46 gm. of methylene chloride and then adding to this solution 19 gm. of the paraffinic hydrocarbon to form a precipitate.) After ¾ hour stirring, the mixture was filtered and the particulate product rinsed with hexane and air dried. A film prepared from this product on a press with platens 175°C. and a pressure of 60 psi. had the following tensile properties:

| | |
|---|---|
| 100% modulus | 660 psi |
| Tensile strength | 3,500 psi |

-continued

| | |
|---|---|
| Elongation | 530% |

EXAMPLE 13

628 gm. of molten hydroxyl terminated polybutylene adipate, mol. wt. 1,000, was added slowly with stirring to 314 gm. of molten 4,4'-diphenylmethane diisocyanate. When the addition was complete, 1 gm. of dibutyl tin dilaurate was added causing an immediate rise in viscosity. About ½ hour later 30 gm. of sodium dioctyl sulfosuccinate dissolved in 30 gm. of liquid paraffinic hydrocarbon was added, followed by a solution of 28 gm. of the surfactant used in Example 1 dissolved in 1400 gm. of heptane. An emulsion was formed with prepolymer as the internal phase. While this was being stirred at 74°C., 59.2 gm. of 1,4-butanediol was added. After 182 hour stirring, the reaction mixture was filtered and particulate product was rinsed with hexane and air dried. A film prepared from this product on a hydraulic press with platens at 160°C. and pressure of 60 psi. had the following tensile properties:

| | |
|---|---|
| 100% modulus | 1,100 psi |
| Tensile strength | 7,500 psi |
| Elongation | 735% |

EXAMPLE 14

To a 47°C. mixture of 62.5 gm. of 4,4'-diphenylmethane diisocyanate, 5.6 gm. of the surfactant used in Example 6, and 293 gm. of the hydrocarbon liquid of Example 1 there was added slowly with stirring 126.2 gm. of polytetramethylene ether glycol, mol. wt. 1,000. When the addition was complete 0.2 gm. of dibutyl tin dilaurate was added. Five minutes later 11.32 gm. of 1,4-butanediol was added to the 60°C. prepolymer emulsion. After ¾ hour stirring, the reaction mixture was filtered and the particulate product rinsed with hexane and air dried. A film prepared from this product on a hydraulic press with platens at 160°C. and pressure of 60 psi. had the following tensile properties:

| | |
|---|---|
| 100% modulus | 700 psi |
| Tensile strength | 6,300 psi |
| Elongation | 885% |

Having thus described my invention, what I claim as new and desire to secure as Letters Patent of the United States is:

1. The method for preparing polyurethane resins directly in finely divided form from reaction of a first reactant comprising at least one organic polyisocyanate with a second reactant comprising at least one organic compound containing at least two groups having active hydrogen to form a solid reaction product, said first reactant being employed in amount relative to the amount of said second reactant to give a molar ratio of active hydrogen to —NCO in the range of from about 0.85:1 to ablut 1.15:1, said method comprising the steps of emulsifying, said active hydrogen compound reactant in liquid form with the aid of a polymeric surfactant as fine droplets in a continuous phase comprising an organic liquid inert to and less polar than said reactant and in which at least said one reactant and said solid reaction product are substantially insoluble and the other of said reactants is miscible, said surfactant being present in amount of from about 0.1% to about 10% on the weight of emulsified insoluble liquid reactant, dissolving said miscible reactant in said inert organic liquid, reacting said emulsified insoluble reactants with said miscible dissolved reactant by interfacial reaction between the droplets of said emulsified reactant and dissolved reactant in said inert organic liquid under conditions of vigorous agitation to form fine particles of said polyurethane separable from said inert liquid by settling, and separating said particles from said inert liquid, the molecules of said polymeric surfactant having an average molecular weight of at least about 2,000, and having polar groups which associate with the surface of said droplets of emulsified insoluble reactant and with particules of said solid reaction product and less-polar groups which are solvated by the said inert organic liquid, the quantity and the balance of polar to less-polar groups of said surfactant relative to the polarities of said inert organic liquid, said insoluble emulsified liquid reactant and said reaction product providing that the total association of less polar groups with said inert organic liquid is greater than the total association of the polar groups with said emulsified insoluble reactant and with said solid reaction product by an amount to ensure that said inert liuqid will be the external phase, but is less than the amount which would interfere with formation of a fine emulsion of the insoluble liquid reactant in said inert organic liquid, coordinating (a) the intensity of said agitation; (b) the quantity and the balance of polar to less-polar groups of said surfactant in said emulsion and (c) the polarities of said inert organic liquid, said emulsified insoluble liquid reactant and said reaction product to form a fine emulsion in which at least about 95% by weight of the droplets of said emulsified liquid reactant will be in the range of from 1 to 300 microns in diameter so that the particles of reaction product will settle, the association of said surfactant with said reaction product holding said surfactant on the surface of said particles of reaction product to impede agglomeration of said particles.

2. The method for preparing polyurethane resins directly in finely divided form as defined in claim 1 in which said emulsified insoluble reactant in said compound containing groups having active hydrogen and said surfactant is a copolymer of two types of monomer of which one, if homopolymerized, would have a polarity compatible with the emulsified reactant and the other, if homopolymerized, would have a lower polarity compatible with the inert organic liquid.

3. The method for preparing polyurethane resins directly in finely divided form as defined in claim 2 in which the intensity of agitation, the quantity and balance of polar to less-polar groups of said surfactant and the polarities of said insoluble reactant and said reaction product are coordinated to provide that at least about 95% by weight of the particles of reaction product are in the range of from about 5 to about 75 microns in diameter.

4. The method for preparing polyurethane resins directly in finely divided form as defined in claim 3 in which the ratio of active hydrogens to —NCO of said reactants is in the range of from about 0.95:1 to about 1.05:1, in which said reactants constitute up to about 60% by weight of the total weight of reaction mixture and the inert organic liquid is an aliphatic hydrocarbon liquid having a boiling point in the range of from about 65°C. to about 200°C. and in which said surfactant is a copolymer of at least one acrylic or methacrylic acid ester of an alcohol having at least four carbon atoms to provide the less-polar groups and at least one acrylic or methacrylic acid ester of a member of the group consisting of methyl alcohol, and N,N-diethylaminoethyl alcohol to provide the polar groups.

5. The method for preparing polyurethane resins directly in finely divided form as defined in claim 4 in which said surfactant is the product of grafting methylmethacrylate monomer to polylaurylmethaorylate in proportion to give a mole ratio of methyl to lauryl groups of 1:1.7, the product having a molecular weight of about 22,000.

6. The method for preparing polyurethane resins directly in finely divided form as defined in claim 4 in which said surfactant is a block copolymer of polylaurylmethacrylate and polymethylmethacrylate in which the mole ratio of methyl groups to lauryl groups is about 1.1:1 and the molecular weight is about 8,400.

7. The method for preparing polyurethane resins directly in finely divided form as divided in claim 4 in which said surfactant is a linear copolymer of laurylmethacrylate and N,N-diethylaminoethylmethacrylate in which the mole ratio of lauryl groups to diethylaminoethyl groups is 1.2:1 and the molecular weight is about 3,700.

8. The method for preparing polyurethane resins directly in finely divided form as defined in claim 2 in which said emulsified insoluble reactant comprises at least one —OH terminated polyester or polyalkylene ether polyol having a molecular weight of from about 300 to about 4,000.

9. The method for preparing polyurethane resins directly in finely divided form as defined in claim 8 in which said soluble reactant is a member of the group consisting of aromatic and cycloaliphatic diisocyanates.

10. The method for preparing polyurethane resins directly in finely divided form as defined in claim 9 in which said diisocyanate is added to an already formed emulsion of said insoluble reactant under conditions of vigorous agitation.

* * * * *